Sept. 11, 1934.  C. T. RAULE  1,973,099
OIL CIRCULATING PUMP FOR BEARINGS
Original Filed Oct. 7, 1926
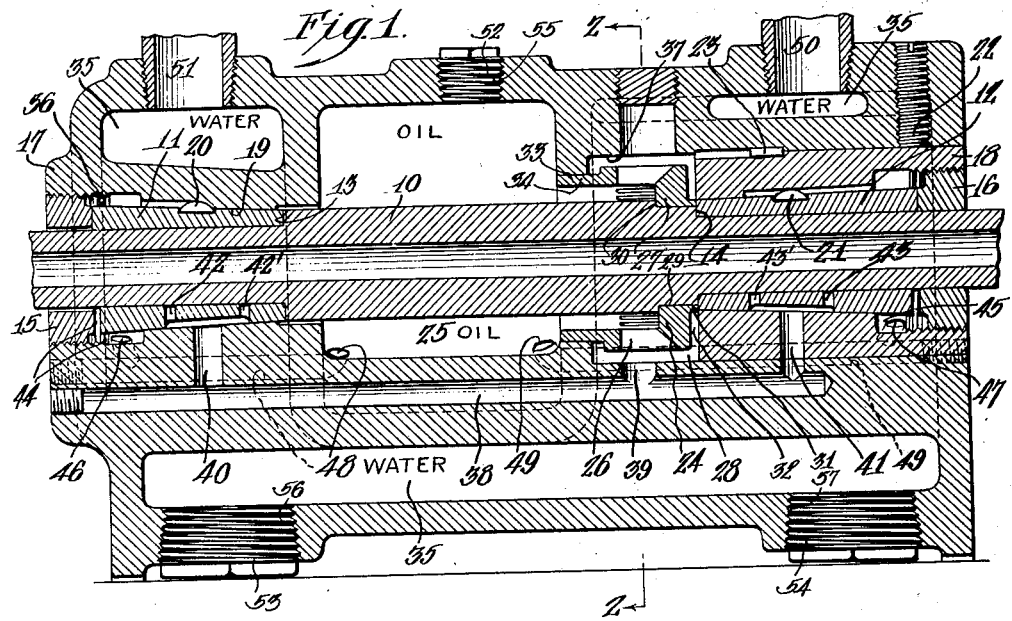
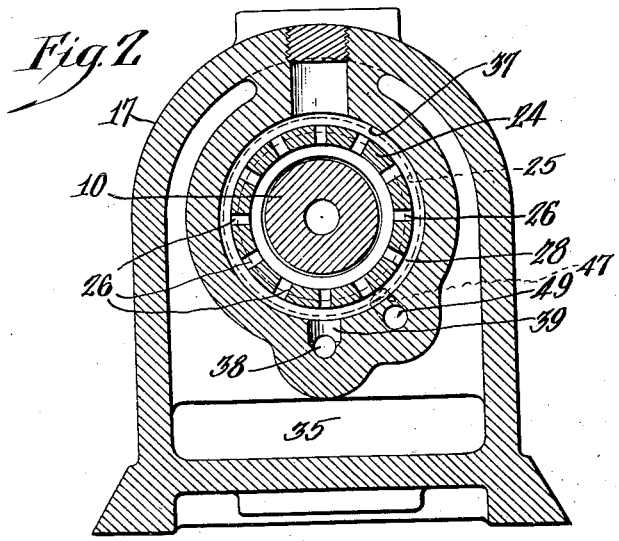

Patented Sept. 11, 1934

1,973,099

UNITED STATES PATENT OFFICE 1,973,099

OIL CIRCULATING PUMP FOR BEARINGS

Clifford T. Raule, Brookline, Pa.

Application October 7, 1926, Serial No. 140,032
Renewed January 24, 1930

5 Claims. (Cl. 308—127)

My invention relates to a system for circulating oil through high-speed bearings such as are used in grinding mechanisms and the like.

A purpose of my invention is to circulate oil through spaced bearings by means of centrifugal force.

A further purpose is to deliver oil from an oil receptacle surrounding a high-speed shaft by means of an annular cup mounted on the shaft concentrically and radially slotted to throw the oil.

Further purposes will appear in the specification and in the claims.

I prefer to illustrate my invention in only one of its forms, but have selected a form that is practical and efficient in operation and which illustrates particularly well the principles involved.

Figure 1 is a longitudinal section of structure embodying my invention as applied to a high-speed bearing.

Figure 2 is a section of the structure of Figure 1 taken upon the line 2—2 thereof.

Like numerals refer to like parts in all figures.

Describing in illustration and not in limitation and referring to the drawing:—

The high-speed shaft 10 shown in the figures is illustrated as a typical example of any high-speed shaft and may be the hollow spindle of a grinding machine, turning in split cone bearings 11 and 12 that support the spindle against longitudinal movement and are adjustable to take up wear.

The shaft is reduced at each end to provide the oppositely directed shoulders 13 and 14 which receive the ends of the split cone bearings 11 and 12, and the cones are respectively held to their duty longitudinally by bushings 15 and 16 respectively threaded into the main housing 17 and the adjustment sleeve 18.

The split cones make taper fit one into the housing at 19 and the other into the adjustment sleeve 18, are kept from rotation by suitable slot and key connections at 20 and 21 and converge to take up wear if forced inwardly within their conical housings.

In taking up wear the adjustment sleeve 18 is loosened at screw 22, the bushing 15 screwed inwardly to the requisite distance, the whole shaft and the adjustment sleeve moving away longitudinally. The bushing 16 is then suitably tightened after which the adjustment sleeve is set to place by screw 22. While free to move longitudinally, if the screw 22 is loosened, the adjustment sleeve is kept from rotation by any suitable slot and key connection 23 with the housing 17.

The oil circulating unit comprises an annular cup 24 revolving with the shaft and opening into and sealing with an oil reservoir 25. It is mounted concentrically upon the shaft adjacent one of the bearings and slotted at 26 outwardly near the bottom 27 to discharge into an annular compartment or passage 28.

The cup is shown adjacent the bearing 12 and its bottom or hub 27 fits upon a reduced portion 29 of the shaft against a shoulder 30.

The hub or bottom is advantageously longitudinally rearwardly flanged at 31 in order to provide radial passage 32 from the discharge compartment 28 to the inner end of the bearing.

The seal between the oil reservoir 25 and the cup 24 is preferably one unaffected by the slight longitudinal shifting in the position of the shaft 10, that takes place when adjusting the split cone bearings to take up wear and the seal is desirably a longitudinally slidable one at 33 along and around the outside of a cylindrical portion 34 of the cup.

The main housing is preferably a single casting perforated longitudinally to pass the shaft, with the oil reservoir 25 in the middle and a water jacket 35 around the bearings.

The casting 17 is conically bored at 19 to fit the split cone 11 and counterbored and threaded at 36 to receive the bushing 15.

From the other end it is bored at 33 to make sliding fit with the outside of the cylindrical portion 34 of the annular cup 24 and counterbored at 37 to provide the oil discharge compartment 28 at its inner end and to receive the adjustment sleeve 18.

A longitudinal hole 38 connects at 39 to the discharge compartment 28 and through passages 40 and 41 with cone bearings 11 and 12 respectively. Suitable inlet passages 42, 42' and 43, 43' are shown at the cones.

The oil return takes place from compartments 44 and 45 at the outer ends of the respective cones through passages 46 and 47 through passages 48 and 49, respectively to the oil reservoir 25, and from the inner end of one of the bearings (illustrated as from the bearing 11) inwardly along the shaft to the oil reservoir.

The inner end of the other bearing is located adjacent to the high pressure oil discharge compartment 28 so that oil flow here will be outwardly into the bearing.

In operation the oil reservoir is partially or wholly filled with oil, at least sufficient oil being put in to flow by gravity into the open end of the cup 24. The annular cup 24 revolving at high velocity with the spindle discharges the oil through the slots 26 into the discharge compartment 28 from which it flows under the pressure of discharge through passage 39 and passages 38 and 40 and 41 to the respective bearings to ultimately return to the oil reservoir from compartments at the outer ends of the bearings via the return passages 48 and 49 as well as inwardly along the shaft of one of the bearings.

With the high velocity of rotation used a pressure of many pounds per square inch may be obtained if desired.

The cylindrical sliding seal between the outside of the cup and the main housing permits adjustment of the split cones with its slight longitudinal movement of the shaft without interfering with the effective operation of the oil circulating unit.

When the oil reservoir is sealed the oil circulates well through the bearing and back again. With free air inlet to the oil reservoir there is a tendency of the oil to leak out at the ends of the bearing.

Preferably cooling water enters the jacket at 50 and leaves it at 51 so that the whole bearing is thus not only provided with an efficient oil circulation but is also water jacketed. Plugs 52, 53 and 54 are shown as closing filling opening 55 and core openings 56 and 57.

In view of my invention and disclosure variations and modifications to meet individual whim or particular need and to obtain part or all of the benefit of my invention without copying the structure of the drawing will doubtless become evident to others skilled in the art and I therefore claim all such in so far as they fall within the reasonable spirit and scope of my invention.

Having thus described my invention what I claim as new and desire to secure by Letters Patent is:—

1. In an oil circulating system for a high-speed shaft and its bearing, a shaft having a bearing, a cup mounted on the shaft concentrically with it and outwardly perforated near its bottom and a casing about the bearing having an oil reservoir opening into and sealing against the cup, an oil delivery passage from the outside of the cup to the bearing and an oil return passage from the bearing to the reservoir.

2. In an oil circulating system for a high-speed shaft and its bearing, a horizontal shaft having a bearing, a cup mounted on the shaft concentrically with it and outwardly perforated to drive oil centrifugally, and a casing about the bearing having an oil reservoir opening into the cup, a longitudinally slidable seal between the cup and reservoir, an oil delivery passage from the outside of the cup to the bearing and an oil return passage from the bearing to the reservoir.

3. In an oil circulating system for a high-speed shaft having spaced split cone bearings, walls forming an oil reservoir surrounding the shaft between the bearings, a cup mounted on the shaft concentrically with it opening into the reservoir, a slidable seal between the cup and the reservoir and walls forming an oil delivery passage from the outside of the cup to the respective bearings to the reservoir.

4. In an oil circulating system for a high-speed shaft and spaced split cone bearings upon it, walls forming an oil reservoir surrounding the shaft between the bearings, an annular cup concentrically mounted on the shaft, opening into the reservoir and outwardly perforated to discharge oil, a longitudinally slidable seal between the reservoir and the revolving cup, walls forming conduit connection from the outside of the cup adjacent the perforations to the respective bearings, conduit return from the bearings to the reservoir and a water jacket surrounding the bearings.

5. In an oil circulating system for a high-speed shaft and its spaced split cone bearings, an oil reservoir surrounding the shaft between the bearings, an annular cup concentrically mounted on the shaft, opening into the reservoir and discharging oil outwardly, walls directing the oil therefrom to the respective bearings, water cooling provision for the bearings surrounding the oil fed thereto and water cooling provision for the reservoir communicating with the other water cooling provision to permit inlet at one point and outlet at another for the entire water cooling.

CLIFFORD T. RAULE.